(12) United States Patent
Fulks et al.

(10) Patent No.: US 7,497,523 B2
(45) Date of Patent: Mar. 3, 2009

(54) PRESSURE LOCKING MASTER CYLINDER

(75) Inventors: Gary C. Fulks, Dayton, OH (US);
Douglas E. Poole, Dayton, OH (US);
Timothy A. Haerr, Enon, OH (US)

(73) Assignee: Delphi Technologies, Inc., Troy, MI (US)

( * ) Notice: Subject to any disclaimer, the term of this patent is extended or adjusted under 35 U.S.C. 154(b) by 360 days.

(21) Appl. No.: 11/074,460

(22) Filed: Mar. 8, 2005

(65) Prior Publication Data

US 2005/0200196 A1  Sep. 15, 2005

Related U.S. Application Data

(60) Provisional application No. 60/552,874, filed on Mar. 12, 2004.

(51) Int. Cl.
*B60T 13/74* (2006.01)
*B60T 11/00* (2006.01)

(52) U.S. Cl. .............................. 303/3; 303/15; 303/89; 91/43; 60/589

(58) Field of Classification Search .............. 303/113.3, 303/114.1, 115.2, 3, 5, 15, 20, 89; 60/548, 60/554, 589, 562; 91/369.2, 369.4, 43; 188/345
See application file for complete search history.

(56) References Cited

U.S. PATENT DOCUMENTS

| | | | | | |
|---|---|---|---|---|---|
| 3,159,974 | A | * | 12/1964 | Rodgers | 60/562 |
| 3,698,190 | A | * | 10/1972 | Miyai | 60/562 |
| 4,437,310 | A | * | 3/1984 | Morita et al. | 60/562 |
| 4,793,589 | A | * | 12/1988 | Eldredge et al. | 251/30.03 |
| 5,018,353 | A | * | 5/1991 | Pugh | 60/562 |
| 6,431,662 | B2 | * | 8/2002 | Isono et al. | 303/114.3 |

* cited by examiner

*Primary Examiner*—Melody M Burch
(74) *Attorney, Agent, or Firm*—Thomas N. Twomey

(57) ABSTRACT

A pressure locking master cylinder including a fluid reservoir for storing a hydraulic fluid, a housing, a piston slidably received within the housing and defining a working chamber and a blocking chamber, wherein the blocking chamber is in fluid communication with the reservoir, and a valve positioned between the blocking chamber and the reservoir, the valve being adapted to selectively trap the hydraulic fluid within the blocking chamber to lock the piston in a position with respect to the housing.

4 Claims, 5 Drawing Sheets

PRESSURE LOCKING MASTER CYLINDER

This application claims priority from U.S. Provisional Patent App. No. 60/552,874 filed on Mar. 12, 2004, the entire contents of which are incorporated herein by reference.

BACKGROUND

The present application relates to vehicle braking systems and, more particularly, vehicle braking systems that utilize a hydraulic master cylinder.

It is common for vehicles such as automobiles to be operated on unlevel terrain. When a vehicle equipped with a manual transmission begins to move on an uphill grade, the driver must release the vehicle's brake pedal while at the same time releasing the clutch pedal and pressing on the accelerator pedal. If the hill is particularly steep, the vehicle may roll backward if the brake pedal is released before the clutch is engaged. This can cause the vehicle to collide with objects and/or a loss of control. Even properly executed, this process of "slipping the clutch" contributes to driver fatigue and wearing of the vehicle's clutch and brake.

Likewise, vehicles utilizing automatic engine-stopping technology also encounter difficulties when operating on unlevel terrain. These "idle-stop" vehicles are adapted to turn off the engine when the vehicle is stopped (such as at a traffic light) to conserve fuel and reduce emissions. The engine automatically restarts when the driver presses on the accelerator. To enable restarting, the transmission is automatically disengaged while the engine is off, and is automatically re-engaged only after the engine is running again. While the transmission is disengaged, the vehicle is free to roll forward or backward. Since there is an inherent lag between the time the engine is started and the time the transmission is re-engaged, there is a need for a means to keep an idle-stop vehicle from rolling when started from a stopped position on unlevel terrain.

It is desirable to provide an automatic braking system for use with idle-stop vehicles and vehicles having a manual transmission. Various braking systems that utilize a hydraulic master cylinder are preferably adapted for use in an automatic braking system due to the prevalence of hydraulic brakes. Examples in the art include Delphi TCS6, DBC7, Smartboost and Eboost systems. However, available hydraulic braking systems all suffer from one or more drawbacks, such as noise, limited brake holding time, limited brake pressure at altitude, and limited brake pressure with the engine off. These drawbacks limit their use as automatic brakes.

Accordingly, there is a need for a low-noise automatic brake holding system that is capable of holding the brake for a sufficient period of time, operating at higher elevations and providing sufficient brake pressure with the engine off. There is a particular need for an automatic brake holding system having a hill-holding capability that is able to automatically keep the brakes applied after a stop, such that the driver need not keep his or her foot on the brake, and then gradually releases the brakes when the accelerator is engaged, enabling a smooth start and preventing the vehicle from unintentionally rolling when operated on unlevel terrain.

SUMMARY

One aspect of the pressure locking master cylinder includes a fluid reservoir for storing a hydraulic fluid, a housing, a piston slidably received within the housing and defining a working chamber and a blocking chamber, wherein the blocking chamber is in fluid communication with the reservoir, and a valve positioned between the blocking chamber and the reservoir, the valve being adapted to selectively trap the hydraulic fluid within the blocking chamber to lock the piston in a position with respect to the housing.

A second aspect of the pressure locking master cylinder includes a fluid reservoir for storing a hydraulic fluid, a housing, a first piston slidably received within the housing, the first piston defining a first working chamber and a blocking chamber, wherein the blocking chamber is in fluid communication with the reservoir, a second piston slidably received within the housing, the second piston defining the first working chamber and a second working chamber, and a normally open solenoid valve positioned between the blocking chamber and the reservoir, wherein the solenoid valve is adapted to selectively prevent a flow of hydraulic fluid from the blocking chamber to the reservoir.

Another aspect of the pressure locking master cylinder includes a method for locking a brake including the steps of providing a master cylinder having a piston slidably received therein, the piston defining a working chamber and a blocking chamber, filling the working chamber and the blocking chamber with a hydraulic fluid, advancing the piston into the working chamber to actuate the brake, thereby decreasing a volume of the working chamber while increasing a volume of the blocking chamber, trapping the hydraulic fluid within the blocking chamber to prevent the piston from retracting into the blocking chamber, thereby locking the brake, and selectively releasing the hydraulic fluid from the blocking chamber to release the brake.

Other aspects of the pressure locking master cylinder will be apparent from the following description, the accompanying drawings and the appended claims.

DETAILED DESCRIPTION

Figure 1:
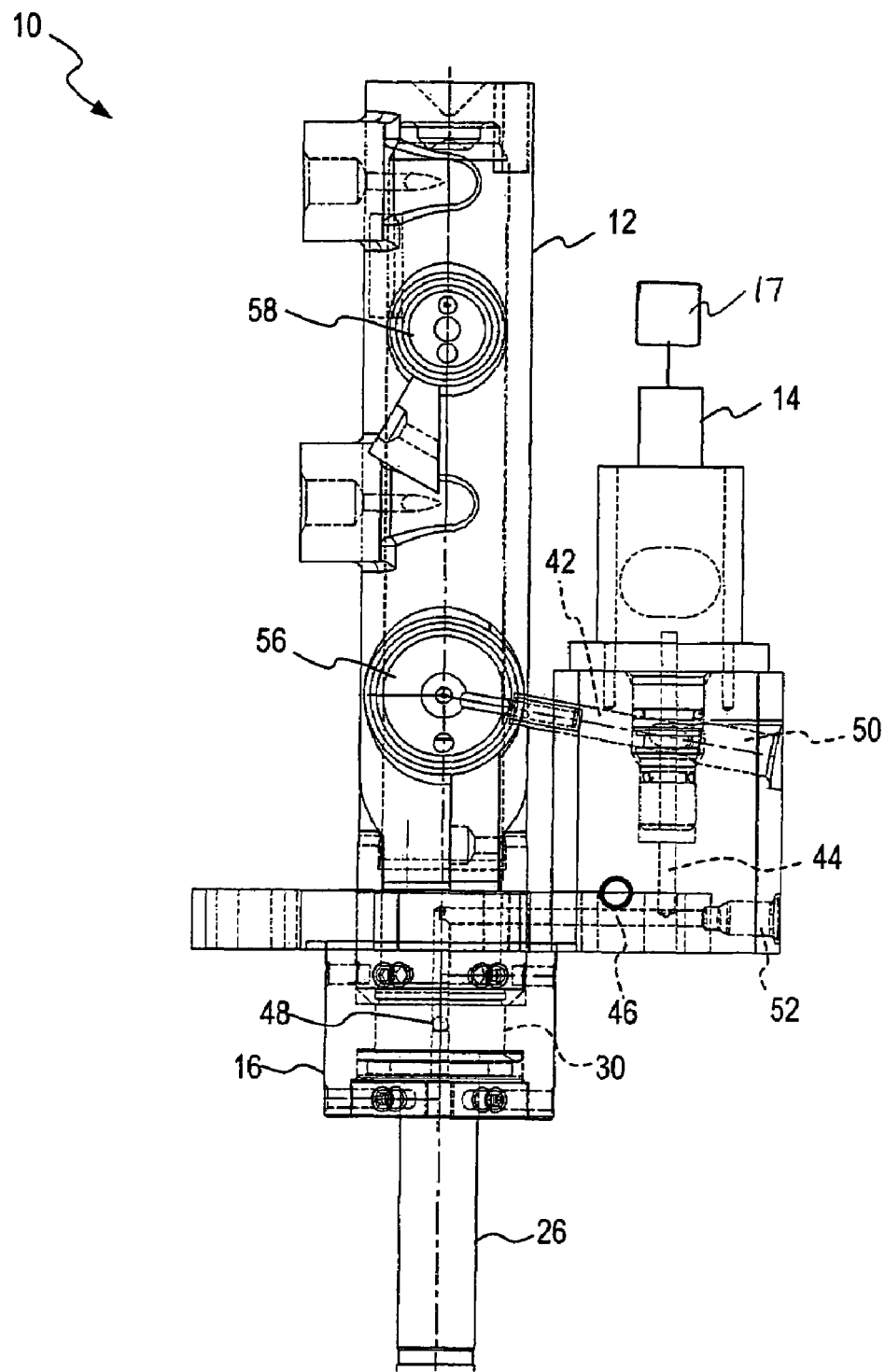
FIG. 1 is a top plan view of one aspect of the pressure locking master cylinder assembly.

FIG. 1 illustrates a top plan view of a pressure locking master cylinder assembly 10. Pressure locking master cylinder assembly 10 includes three major components: a master cylinder 12, a valve 14 (e.g., a normally open solenoid valve) and a bridge 16. Master cylinder 12 acts as an interface between a mechanical brake actuator input, such as a brake pedal (not shown) and a hydraulic braking system (not shown). Solenoid 14 controls the flow of hydraulic fluid in master cylinder 12, as will be described more fully below. Bridge 16 serves as a mounting fixture for connecting master cylinder 10 to the vehicle (not shown). A control unit or device 17, such as a microprocessor or a programmable logic device ("PLD"), may be used to control actuation of proportional solenoid valve 14. The control device 17 may utilize a predetermined set of instructions, such as a computer program or algorithm 100 (see FIGS. 3-5). According to one aspect of the pressure locking master cylinder, master cylinder 12 and bridge 16 may be combined into one machined component.

Figure 2:
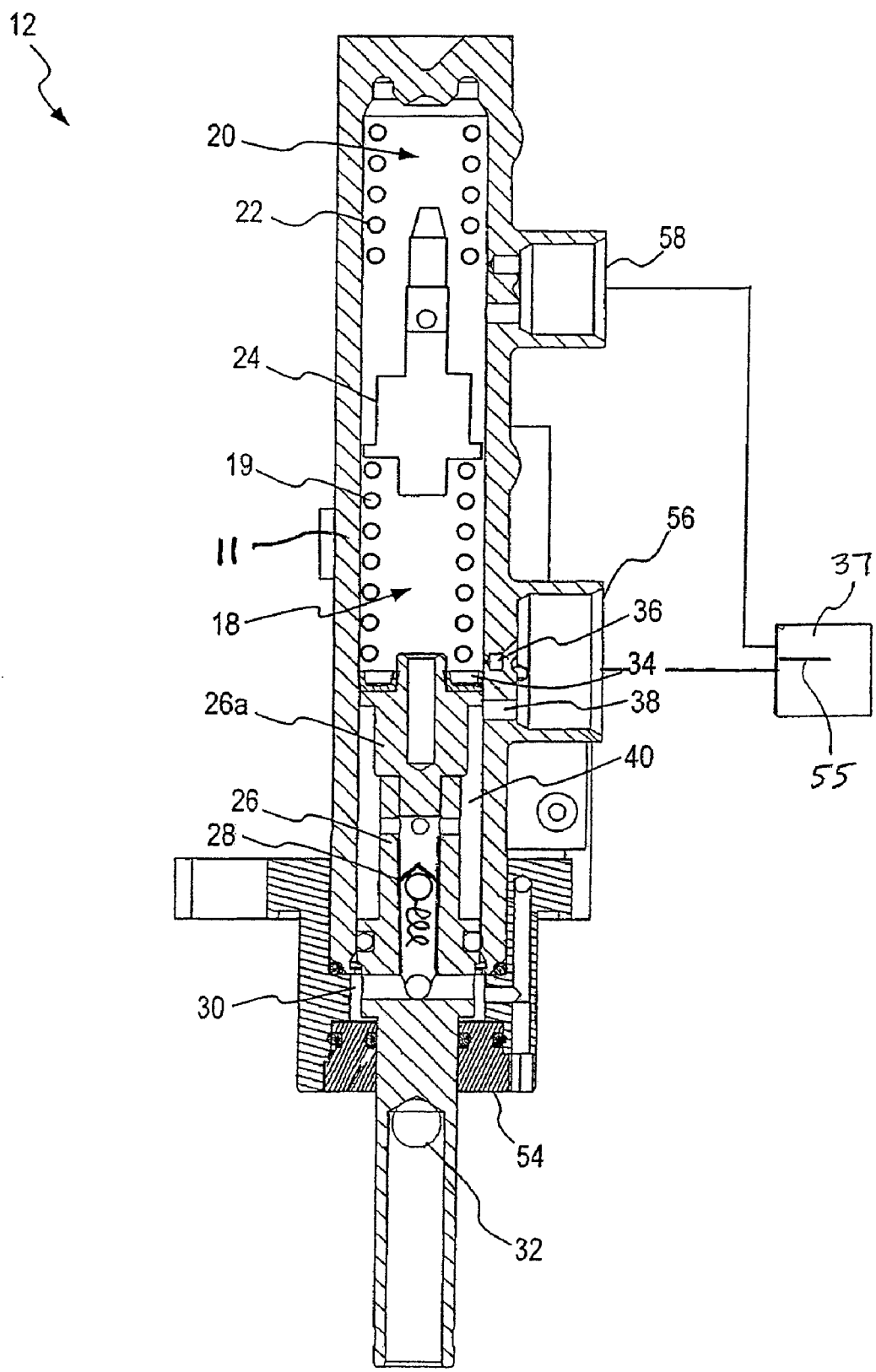
FIG. 2 is a side elevational view, in section, of the master cylinder of FIG. 1.

FIG. 2 illustrates a side elevational, cross-sectional view of master cylinder 12. In one aspect, as shown in FIG. 2, master cylinder 12 may be a bypass hole type master cylinder. Master cylinder 12 may include a master cylinder housing 11, a primary working chamber 18 and a secondary working chamber 20. Primary working chamber 18 may include a return spring 19, a primary piston 26, a check valve 28 and a blocking chamber 30. Primary working chamber 18 may be connected to hydraulic fluid reservoir 37 by primary reservoir port 56. Secondary working chamber 20 may include a return spring 22 and a secondary piston 24. Secondary working chamber 20 may be connected to hydraulic fluid reservoir 37 by secondary reservoir port 58.

During normal braking operation, a mechanical force is applied to the primary piston 26 generally at location 32 by the output rod from a vacuum booster (not shown) when a driver depresses an associated brake pedal (not shown). Primary piston 26 moves upwardly (i.e., advances) such that a primary lip seal 34 moves past a by-pass opening 36 and decouples primary working chamber 18 from hydraulic fluid reservoir 37. Additional movement of piston 26 compresses hydraulic fluid in primary working chamber 18 (i.e., reduces the volume of working chamber 18) and provides hydraulic pressure that is transferred to the vehicle's primary wheel braking circuit (not shown). Secondary piston 24 and secondary working chamber 20 function in a likewise manner to provide braking pressure to the vehicle's secondary braking circuit.

As primary piston 26 advances, the volume of blocking chamber 30 expands, thereby drawing hydraulic fluid from the reservoir 37 through a primary reservoir port 56. Reservoir 37 is divided into two chambers by divider 55, each dedicated to one of primary working chamber 18 and secondary working chamber 20.

In one aspect of the pressure locking master cylinder, fluid may be drawn from the reservoir 37 to the blocking chamber 30 by either of two routes. In a first route (i.e., the piston route), fluid can be drawn through a compensation opening 38, a compensation chamber 40, and check valve 28 to blocking chamber 30.

In a second route (i.e., solenoid route), (see FIG. 1) as long as solenoid valve 14 is open, fluid may be drawn through a first passageway 42, solenoid valve 14, a second passageway 44, a third passageway 46, and a fourth passageway 48 to blocking chamber 30. A plug 50 closes off passageway 42. A bleeder screw port 52 closes off third passageway 46 and facilitates service bleeding of blocking chamber 30 when maintenance is performed on the vehicle's braking system. It should be understood that other configurations and routes are within the scope of the present application.

Referring again to FIG. 2, as vacuum booster force in the vehicle braking system (not shown) is released when the driver releases the brake pedal (not shown), primary piston 26 is slidably pushed to a resting position by return spring 19 and compresses fluid in blocking chamber 30. The fluid in blocking chamber 30 returns to primary reservoir port 56 through solenoid valve 14 via the second route (see FIG. 1). Check valve 28 (i.e., a one-way valve) blocks flow back to reservoir port 56 by means of the first route.

With continued reference to FIGS. 1 and 2, when an automatic braking function, such as hill-holding, electrically actuated parking brake apply assist, and idle-stop braking is engaged, as the driver applies pressure to the brake pedal (not shown), the vacuum booster for the vehicle braking system (not shown) applies force to master cylinder 12 in the same manner as that of a normal application of brakes, discussed above. When commanded by a control algorithm 100 (discussed below), solenoid valve 14 is actuated and blocks fluid flow from blocking chamber 30 and reservoir port 56 (i.e., the second route is cut off), thereby trapping fluid in chamber 30. As force is released from primary piston 26, the pressure increases in blocking chamber 30. The pressure retains primary piston 26 in the brakes-applied position. Then, when commanded by the control unit 17 and algorithm 100, solenoid 14 releases the pressure in blocking chamber 30 in a predetermined manner, such as a gradual release, and thus piston 26 returns to its resting position and the braking pressure on the vehicle wheels (not shown) is released.

In alternative aspects of the pressure locking master cylinder, check valve 28 may be located in parallel to solenoid valve 14 instead of in primary piston 26. Solenoid valve 14 may then be located between fluid passageways 42, 46. Further, primary piston 26 may be made of two portions 26, 26a (see FIG. 2) so that check valve 28 can be pressed into the primary piston. Still further, a wall divider 54 may separate hydraulic fluid in blocking chamber 30 from communicating with the vacuum booster of the vehicle's braking system vacuum chamber (not shown).

Figure 3:
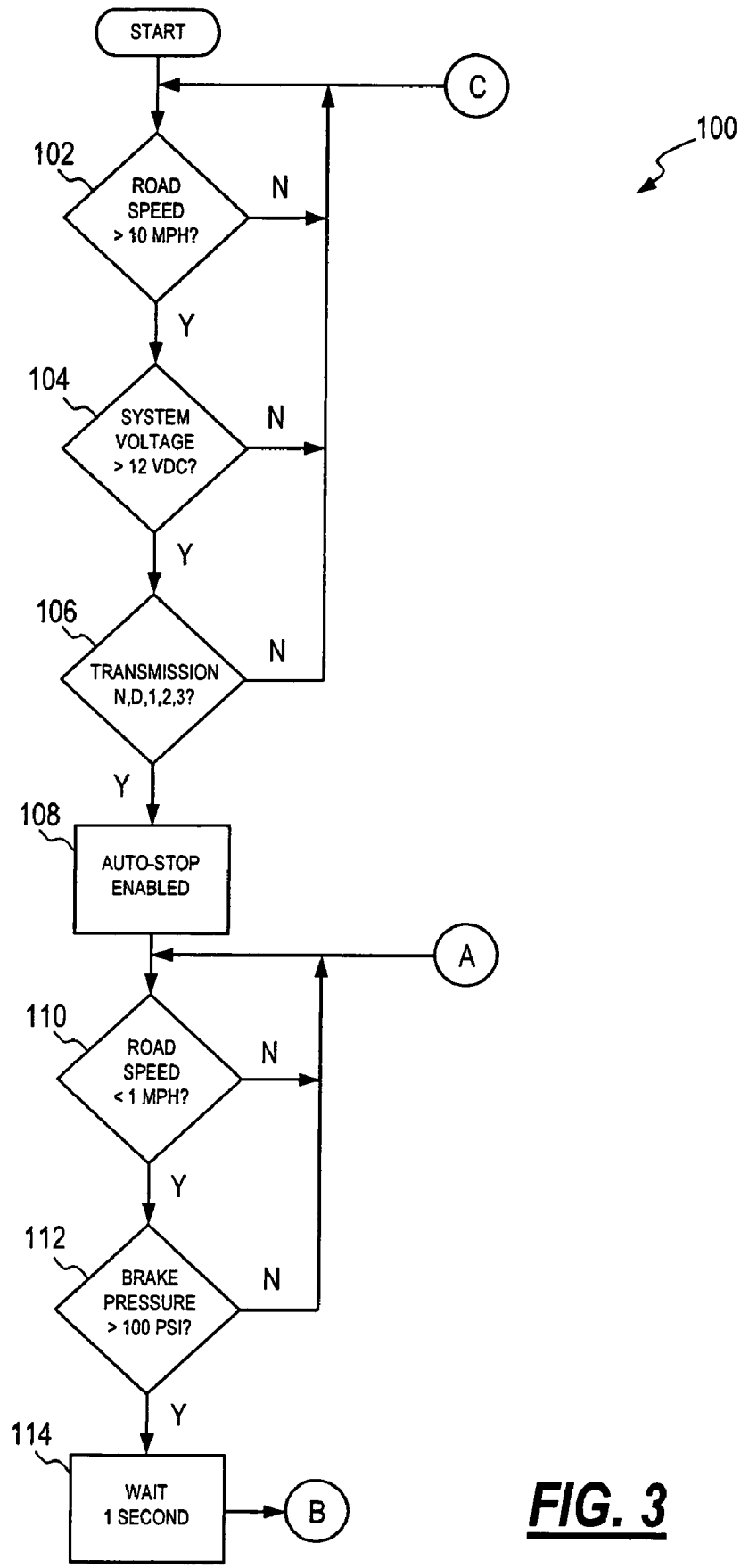
FIG. 3 is a first portion of a flow diagram of a control algorithm for the pressure locking master cylinder assembly of FIG. 1.
Figure 4:
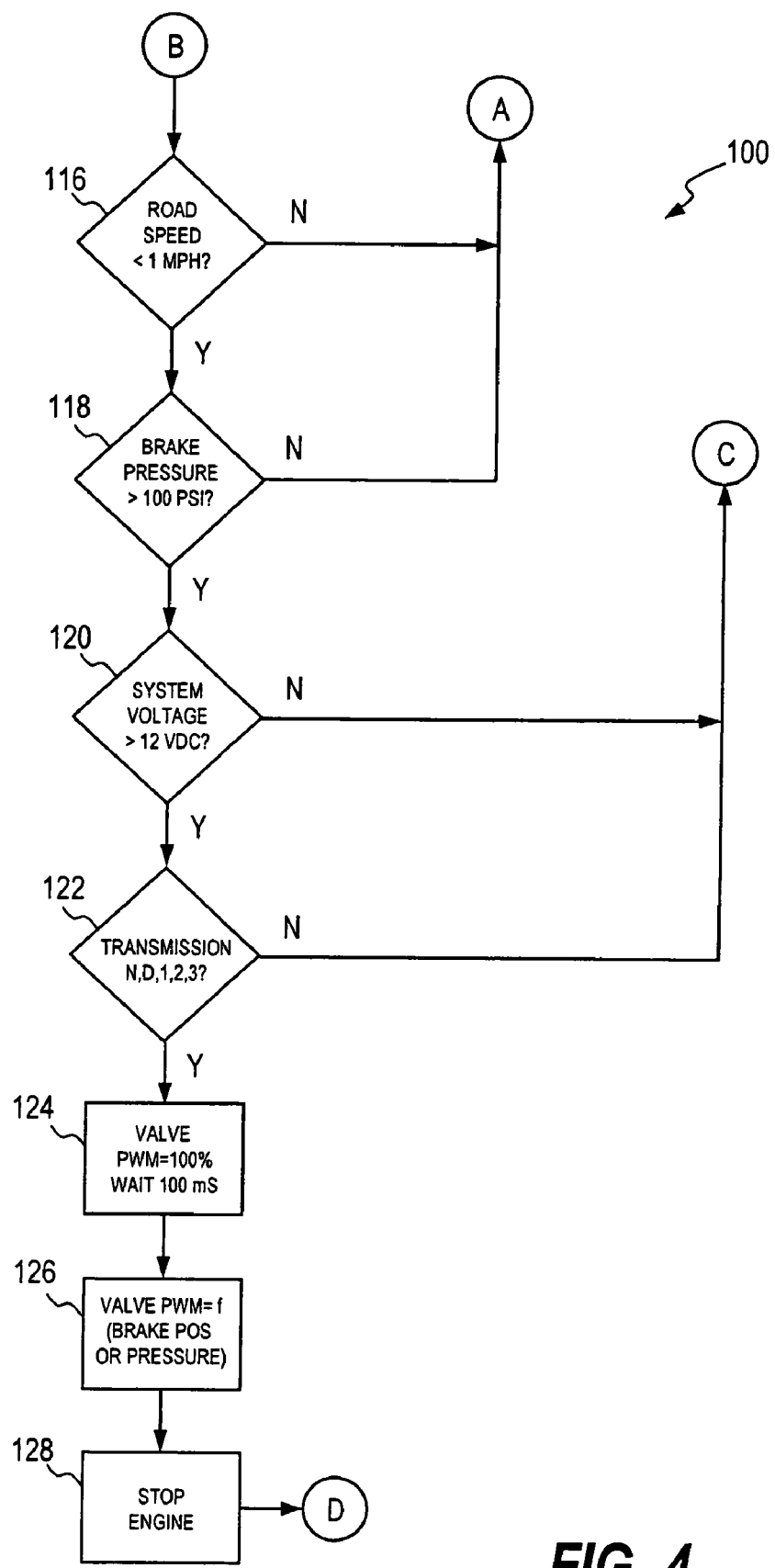
FIG. 4 is a second portion of the flow diagram of FIG. 3.
Figure 5:
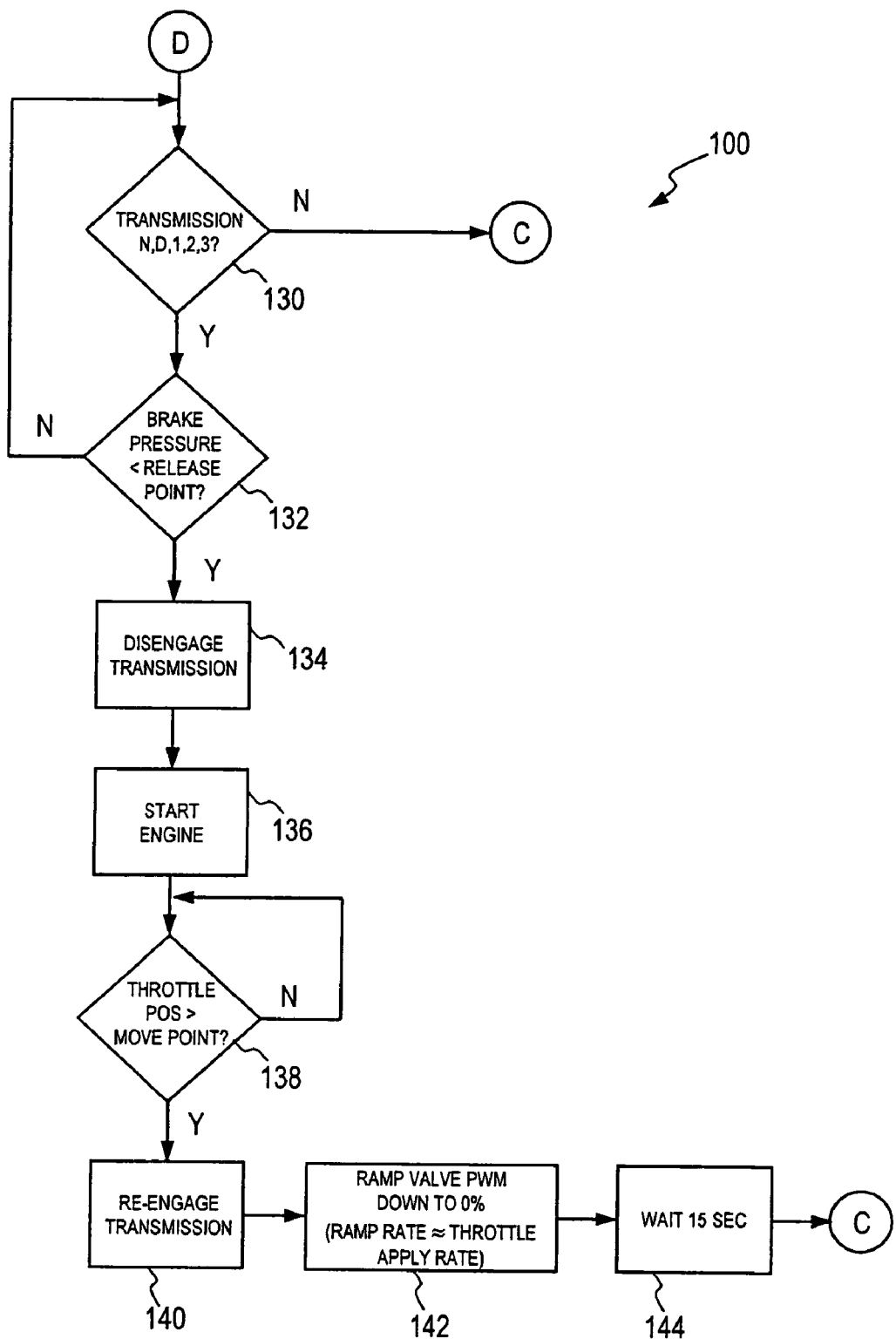
FIG. 5 is a third portion of the flow diagram of FIG. 3.

FIGS. 3-5 provide an exemplary control algorithm 100 for use with the pressure locking master cylinder. Algorithm 100 begins with vehicle status checks, checking at block 102 whether the vehicle is moving faster than a threshold speed, such as about ten miles per hour. If the vehicle is moving faster than the threshold speed, a check of the vehicle's electrical system voltage level is made at block 104. If the voltage level is above a minimum threshold voltage, such as about 12 VDC, the vehicle's transmission is checked at block 106 to see if the vehicle is in one of a set of predetermined modes such as "neutral," "drive," "1," "2" and "3" gear selections. If the transmission is in a predetermined mode, an auto-stop braking control function is enabled at block 108.

The enabled auto-stop braking function monitors vehicle speed at block 110 to determine when the vehicle is stopped. If the vehicle is not stopped, algorithm 100 continues to monitor vehicle speed at block 110 until the vehicle is stopped. When the vehicle is stopped at block 110, the pressure of the brakes is checked at block 112 to determine whether the brake pressure is above a predetermined threshold, such as about 100 PSI, indicating that the brakes are being applied by the driver. If the brakes are not being applied, algorithm 100 jumps to a prior set of steps beginning at block 110. If the brakes are being applied at block 112, a time delay, such as about one second, is inserted as at block 114.

Algorithm 100 moves to block 116, as indicated by B in FIGS. 3 and 4, and the road speed is again checked to see if the vehicle is stopped. If the road speed is greater than a threshold value, such as about 1 mile per hour, algorithm 100 jumps to a set of prior steps, beginning at block 110, as indicated by A in FIGS. 3 and 4. If the road speed is less than the threshold value, another check is made of the vehicle's brake pressure at block 118. If the brake pressure is less than a threshold value, such as about 100 PSI, at block 118, algorithm 100 jumps to a set of prior steps, beginning at block 110, as indicated by A in FIGS. 3 and 4.

If the brake pressure is above the threshold value of block 118, the vehicle's electrical system voltage is again checked at block 120. If the voltage is below a threshold value, such as about 12 VDC, algorithm 100 jumps to the beginning, as indicated by C in FIGS. 3 and 4. If the voltage is above the threshold value, a check of the vehicle transmission is made at block 122. If the transmission is not in one of a predetermined set of operating modes, algorithm 100 jumps to the beginning, as indicated by C in FIGS. 3 and 4.

If the transmission is in one of a predetermined set of operating modes at block 122, such as "neutral," "drive," "1," "2" and "3," solenoid valve 14 of master cylinder assembly 10 (see FIG. 1) is pulse width modulated ("PWM") at block 124 by a control (not shown) such that the valve is fully open for a period of time, such as about 100 milliseconds. Then, at block 126, the valve is PWM controlled in proportion to a predetermined braking value, such as brake caliper position or displacement, or brake pressure. The vehicle's engine may be stopped at block 128 to conserve fuel and reduce emissions.

At block 130 (see FIG. 5) the transmission is again checked to ensure that it is in one of a predetermined set of operating modes. If the transmission is not in a predetermined mode, such as "neutral," "drive," "1," "2" and "3," algorithm 100 jumps to the beginning, as indicated by C in FIGS. 3 and 5. If the transmission is in a predetermined mode, a check of the vehicle's brake pressure is made at block 132 to see if the pressure is below a predetermined threshold point, indicating that the brake pressure has fallen below a level sufficient to apply the brakes. If the brake pressure is above the threshold point of block 132, algorithm 100 jumps back to a prior set of steps, beginning with block 130. If the brake pressure of block 132 is below the threshold point, the vehicle's transmission is disengaged at block 134 and the engine is started at block 136. The vehicle's throttle is then monitored at block 138 until the throttle reaches a predetermined threshold position or "move point" indicating that the driver is pressing on the vehicle's accelerator pedal.

If the throttle has exceeded the move point threshold value at block 138, the transmission is re-engaged at block 140. At block 142 solenoid valve 14 (see FIG. 1) is PWM controlled to about 0%, closing the valve and allowing the pressure in primary working chamber 18 to decrease. Primary piston 26 is returned to its resting position by return spring 19, releasing the vehicle's brakes. In one embodiment of the pressure locking master cylinder, the braking pressure may be released over a fixed period of time to gradually and smoothly release the brakes. In another embodiment of the pressure locking master cylinder, the rate of change of the PWM may be ramped at approximately the throttle apply rate. Thus, if the driver depresses the accelerator sharply, commanding rapid vehicle acceleration, the brake pressure is released more quickly in order to prevent brake drag, which would detract from the vehicle's acceleration and contribute to brake wear.

A delay, such as about 15 seconds, is inserted at block 144. Algorithm 100 then returns to the beginning, as indicated by C in FIGS. 3 and 5.

Although the pressure locking master cylinder is shown and described with respect to certain embodiments, it is obvious that modifications will occur to those skilled in the art upon reading and understanding the specification. The pressure locking master cylinder includes all such modifications and is limited only by the scope of the claims.

What is claimed is:

1. A pressure locking master cylinder comprising:
   a fluid reservoir for storing a hydraulic fluid;
   a housing;
   a first piston slidably received within said housing, said first piston defining a first working chamber and a blocking chamber, wherein said blocking chamber is in fluid communication with said reservoir by way of a bidirectional fluid path;
   a first return spring positioned within said first working chamber;
   a second piston slidably received within said housing, said second piston defining said first working chamber and a second working chamber;
   a second return spring positioned within said second working chamber;
   a check valve connected to said first piston, wherein said check valve allows said hydraulic fluid to flow from said reservoir, through said first piston, and into said blocking chamber and prevents said hydraulic fluid from flowing from said blocking chamber back through said first piston; and
   a normally open solenoid valve positioned between said blocking chamber and said reservoir in said bidirectional fluid path,
   wherein said normally open solenoid valve is adapted to selectively prevent a flow of said hydraulic fluid from said blocking chamber to said reservoir by way of said bidirectional fluid path.

2. The master cylinder of claim 1 wherein said normally open solenoid valve is a normally open, proportional solenoid valve.

3. The master cylinder of claim 1 further comprising a control unit for controlling said normally open solenoid valve.

4. The master cylinder of claim 3 wherein said control unit controls said normally open solenoid valve according to a control algorithm.

\* \* \* \* \*